United States Patent [19]

Hill

[11] 4,288,701
[45] Sep. 8, 1981

[54] MARK SENSING DETECTOR
[75] Inventor: Roy K. Hill, Bristol, Va.
[73] Assignee: Sperry Corporation, New York, N.Y.
[21] Appl. No.: 107,968
[22] Filed: Dec. 28, 1979
[51] Int. Cl.³ .............................................. G06K 7/14
[52] U.S. Cl. .................................... 250/569; 235/462
[58] Field of Search .............. 250/566, 568, 569, 570, 250/216; 235/462, 456, 455

[56] References Cited
U.S. PATENT DOCUMENTS

| | | | |
|---|---|---|---|
| 3,569,675 | 3/1971 | Stegeman | 250/569 |
| 3,814,944 | 6/1974 | Berger | 250/569 X |
| 4,122,997 | 10/1978 | Fukuda | 250/569 X |

Primary Examiner—David C. Nelms
Assistant Examiner—Edward P. Westin
Attorney, Agent, or Firm—John B. Sowell; William E. Cleaver; Marshall M. Truex

[57] ABSTRACT

Apparatus for sensing marks on a moving paper object includes light source means for transmitting light through a portion of a partially opaque mark and into the translucent fibers of a paper object. Light detecting means are provided for sensing the relative amount of light transmitted into said fibers by detecting the light in said fibers under said mark at an area transversely disposed from the portion of the mark where the light was applied.

11 Claims, 6 Drawing Figures

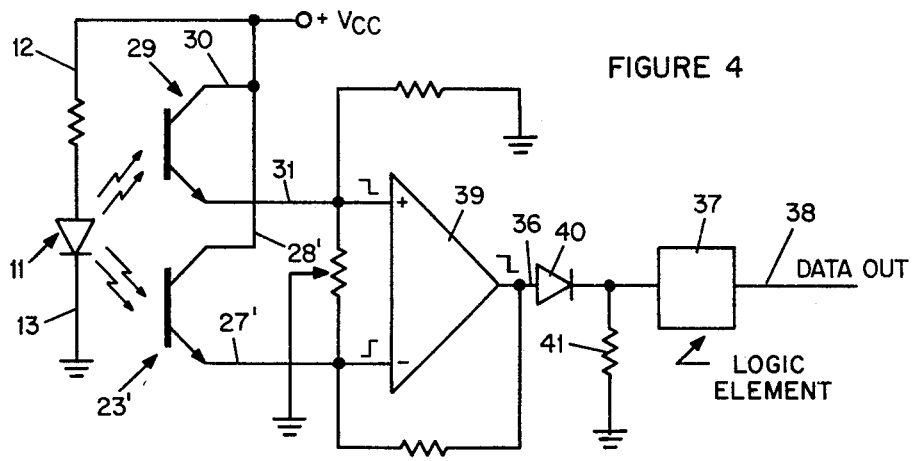
FIGURE 4
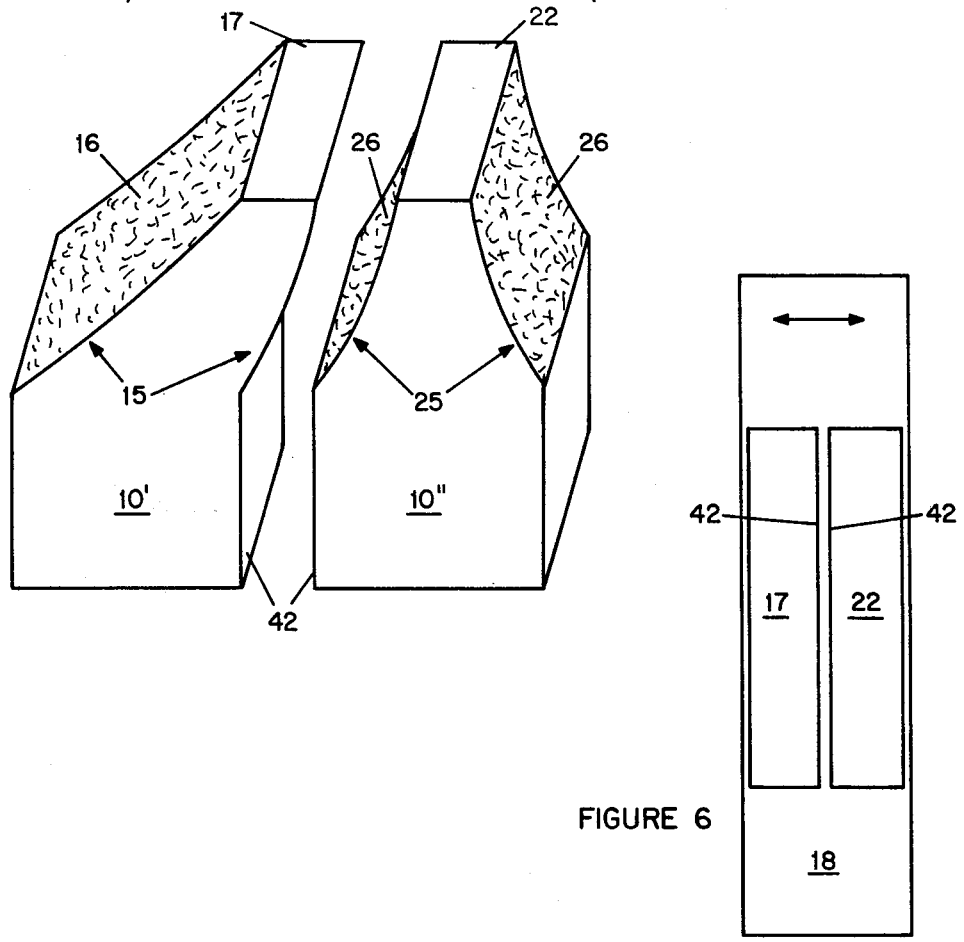
FIGURE 5
FIGURE 6

MARK SENSING DETECTOR

BACKGROUND OF THE INVENTION

1. Field of the Invention

The present invention is related to optical transducers for reading dark coding marks on paper media. More particularly the present invention is related to a way of sensing partially opaque pencil marks on paper cards which does not depend on reflected light as employed in the prior art.

2. Description of the Prior Art

Mark sense data cards are well known and have been in use so long that generally accepted specifications exist for the size and spacing of the marks as well as the hardness of the pencils to be employed for making the marks. Because the data card or paper used has a rough finish, pencil marks do not completely cover or opaque the paper in the marked zone. Also, the pencil mark does not absorb one hundred percent of the light. Such marks are partially opaque and some light will pass through the mark. If the paper without a mark was taken as a perfect reflector and the pencil mark reduced the reflected light by fifty percent, the light to dark ratio would be two to one and could be readily sensed.

Mark sensors of the prior art reflective type require that the card be read in an exact predetermined focal plane because the light source is concentrated on a spot embracing the mark to be sensed and the detector must detect the light reflected from the same predetermined mark, otherwise stray light and diffused light would reduce the accuracy of the light to dark ratio being sensed.

The variation of a card from an optimum focal plane is referred to as card flutter. Manufacturers of optical reflective transducers publish curves which show preferred card to sensor distances and tolerances.

Due to flutter, reflectivity of the card or paper in the mark zone, differences in the absorption of the marks made, as well as aging of the light source, the optimum light to dark ratio of the reflective type sensors have not been uniform or consistently accurate.

Marks may be sensed on cards or objects by transmitting light completely through the paper and sensing the change of light transmitted through the paper. This method of sensing is only applicable where a special translucent calibrated paper is employed.

SUMMARY OF THE INVENTION

It is a principal object of the present invention to provide a novel mark sensing apparatus and method.

It is another object of the present invention to provide a novel mark sensing apparatus having an improved light to dark ratio.

It is another object of the present invention to provide a method of mark sensing which does not depend on reflectivity of light.

It is yet another object of the present invention to provide an apparatus for sensing marks on a translucent fiber paper which is operable from only one side of the paper.

It is yet another object of the present invention to provide an apparatus for sensing partially opaque marks on paper media.

According to these and other objects of the present invention to be discussed in greater detail hereinafter, there is provided an improved optical detecting device for sensing marks on a fiber paper card which includes a LED light emitting source mounted between two funnel-shaped reflective shield members which restricts the light beam and concentrates the light beam into a throat area which is one-half the width of the mark or smaller. The high intensity LED light source beam passes the rays through the mark on the paper card. The light enters into the fibers of the fiber paper card and is transmitted transversely in the card beneath the mark and the light is radiated back from the fibers through another portion of the mark and through adjacent portions of the card adjacent the mark. A light sensing device is directed toward the portion of the card adjacent the lighted portion and the relative amount of light in the fibers beneath the mark and adjacent the mark is sensed at the same surface of the card. Since the marks on the card will absorb appreciably more light than an unmarked portion of the cards there will be a significant attenuation of the light as the light is passed into the fibers and as the light is passed through the mark the second time back to the light detector. Accordingly, there is a significant light to dark ratio sensed by the light detecting sensing means. It will be understood that the high intensity light makes two passes through the mark on the card thereby increasing the light to dark ratio over prior art devices which employ reflective light or pass the light directly through the cards and sense on the other side.

BRIEF DESCRIPTION OF THE DRAWINGS

The foregoing objects and advantages of the novel mark sensing detector and its mode of operation will be made apparent from the detailed description of the accompanying drawings in which:

FIG. 4 is a schematic wiring diagram showing the electrical circuitry for employing the output of two detectors as shown in FIG. 2;

FIG. 5 is a pictorial representation of two transparent plastic bodies which may be employed to encapsulate the light source and light detectors to produce the desired miniaturized throat area and miniaturized sensing area for sensing the absence or presence of a mark; and FIG. 6 is an enlarged pictorial representation showing in comparative size a throat area and a sensing area superimposed on a mark to be sensed.

DESCRIPTION OF THE PREFERRED EMBODIMENT

Figure 1:
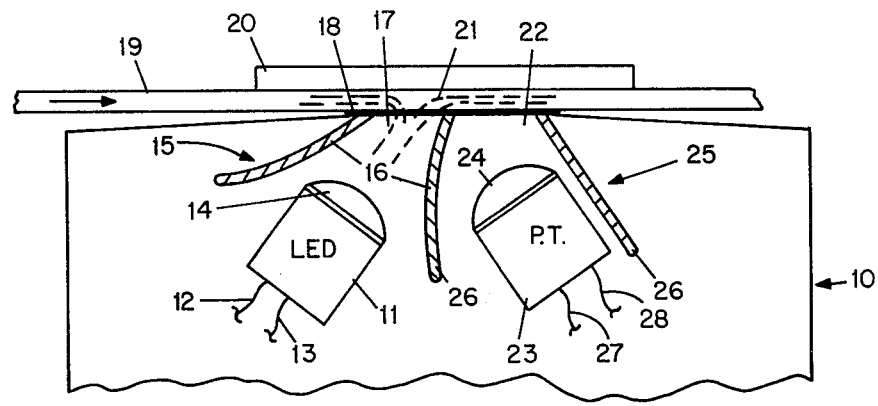
FIG. 1 is a pictorial representation of a preferred embodiment light source and light detector arranged to sense a mark on a translucent fiber card.

FIG. 1 shows pictorially a self-contained module 10 which comprises all the components necessary for the present invention detection apparatus. There is shown a light source means 11 which comprises a high intensity light such as an LED emitting light rays in the infrared spectrum. Electrical leads 12 and 13 are supplied to the light source 11 which are capable of activating light emitting diode 11. Light rays may be concentrated by a lens element 14 and further concentrated by a funnel shaped concentrating device 15 having polished or highly reflective surfaces 16. The funnel or concentrating means 15 terminates in a throat area 17 which is preferably rectangular in shape as will be explained hereinafter. The throat area 17 is shown juxtaposed a mark 18 to be sensed and the width of the throat is shown to be approximately half the width of the mark 18 being sensed as will be explained in greater detail hereinafter. The mark 18 is preferably a graphite pencil mark placed on a mark sensor card 20 which is held flush against the throat 17 by a pressure plate or a guide plate 20. When a pencil mark is placed on a data card the mark may be examined under a microscope and it will be observed that the graphite only coats or covers the high places of the rough surface of the paper leaving the low places uncovered by graphite, thus, the light rays 21 shown in phantom lines will pass through the uncoated areas and to some extent pass through the coated areas which are not completely 100% opaque. The light rays 21 passing through the mark 18 enter into the elongated translucent fibers of the paper and disperse transversely in the axis of the paper. These translucent fibers not only act similar to fiber optics but emit light from their circumferential area along their length. Thus, it will be understood that the fibers which are extended from the throat area 17 to the sensing area 22 will be emitting light which can be detected by the photo detector 23. Photo detector 23 is shown having a lense element 24 for concentrating the light passing through the sensing area 22. The light passing through the sensing area 22 may further be concentrated by the funnel shaped directing means 25 which may be coated with a highly reflected surface 26. As will be explained hereinafter the output generated by the light sensed by the photo transistor 23 is applied via leads 27 and 28 to the logic sensing means which are capable of determining when the mark 18 is in the position shown in FIG. 1. It will be understood that the card 19 may be moved in either direction and properly sensed as will be explained in detail hereinafter.

Figure 2:
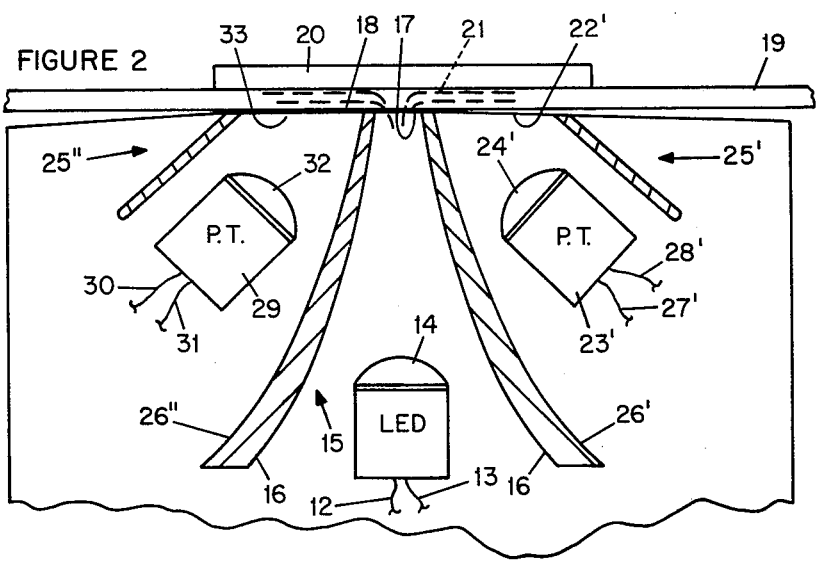
FIG. 2 is a pictorial representation of a modified embodiment of the FIG. 1 light detector showing how a plurality of detectors may be employed.

Refer now to FIG. 2 showing a modified embodiment of FIG. 1. It will be noted that the light emitting diode 11 is identical to the light emitting diode in FIG. 1 and is supplied with the same numbers. The light rays from light emitting diode 11 are directed to the throat area 17 and concentrated by the lens element 14 and the reflective surface 16 of the funnel 15. The high intensity light is capable of passing through the partially opaque mark 18 and entering into the transversely oriented fibers of the fiber paper card 19. The light in the fibers of card 19 may be sensed at the sensing area 22' by the photo transistor detector 23' having a concentrating lens 24' thereon. The funnel 25' is supplied with a highly reflective surface 26' which aids in concentrating the light from the fibers in the card 19. The output of photo transistor 23' is present on leads 27' and 28' and their utilization will be explained in greater detail hereinafter. A second photo transistor 29 is similar to the photo transistor 23' and is provided with output leads 30 and 31. The light rays 21 from the light emitting diode enter the fibers in card 19 and are directed transversely in both directions in the card below the mark 18 and is sensed also by photo transistor 29. Photo transistor 29 is provided with a concentrating lens 32 and an associated funnel element 25" having highly reflective surfaces 26". The light entering sensing area 33 is detected at the second photo transistor 29 and may be employed to provide an enhanced sensing logic as will be explained in greater detail hereinafter.

Figure 3:
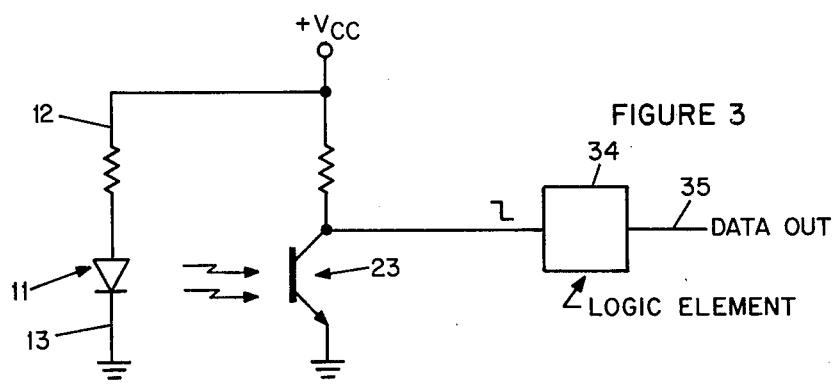
FIG. 3 is a schematic diagram showing a detector and a sensing element which may be employed with the detector of FIG. 1 to produce a data output.

Refer now to FIG. 3 showing light emitting diode 11 and its associated input leads 12 and 13. The light sensed at photo transistor 23 produces a low output signal when the mark 18 is in the position shown at FIG. 1. The low output signal is sensed at logic element 34 and produces a data output signal on line 35 which may be employed in a card reader or other type of signal processing means. It will be appreciated that the mark 18 in the position shown in FIG. 1 can be moving in either direction and the output to the logic sensing element 34 would be the same. It will be understood that associated timing means are employed with moving cards, however, such timing means are well known and do not require explanation.

Referring to FIGS. 2 and 4 there is shown in FIG. 4 a light emitting diode 11 having input lines 12 and 13. When the light emitting diode 11 is activated the light rays pass through the throat 17 and through the mark 18 into the translucent fibers of the card 19 and pass transversely in both directions emitting light to the sensing areas 22' and 33. The light entering sensing area 22' is sensed by photo transistor 23' as a light area and produces a high output signal on line 27' which is applied to the negative terminal of operational amplifier 39. The light from light emitting diode 11 is also sensed by photo transistor 29 as a dark area and produces a low output signal on line 31 which is applied to the positive terminal of operational amplifier 39. The signals to the input operational amplifier 39 produce a low output on output line 36 which is applied to the logic sensing element 37 which produces data output signals on line 38 capable of being processed by a reader or other type logic element. When the mark 18 on card 19 moves to the right in FIG. 2 to block the throat area 17 and the sensing area 22' there is a high output on line 31 and a low output on line 27' thus producing a high output on line 36. When there is no mark 18 present in front of the throat area and sensing areas an intermediate output is produced on line 36 and is sensed as no mark. Diode 40 and resistor 41 comprise a d.c. level shifting network for processing the output of operational amplifier 39.

As explained hereinbefore the novel apparatus is particularly well suited for sensing carbon marks which are placed on data cards. Such a mark is nominally at least 15 thousandths of an inch wide and approximately 150 one thousandths inches long. It will be appreciated that the throat area and sensing areas referred to hereinbefore are smaller than the width and length of a pencil mark. Accordingly, there are presented problems in the manufacture of such miniaturized sensing and light emitting devices.

Refer now to FIG. 5 showing two transparent plastic bodies which may be employed to encapsulate the light emitting diode 11 and the photo transistor 23 to make a module or body 10. The first half of the body 10' may be employed to encapsulate the light emitting diode 11, accordingly, it will be recognized that funnel 15 comprises the shaped surfaces of a plastic body having a highly reflective metalized surface 16 applied to the area surrounding the throat 17. It will be understood that the throat area 17 is clear and transmits light from the encapsulated light emitting diode 11 (not shown). The second part of the body 10" is employed to encapsulate the photo transistor 23 and is provided with shaped surfaces forming the funnel 25 and are metalized at the outer surface 26 to provide the highly reflective inner surfaces 26 which concentrate the light to the photo transistor 23 (not shown). The light being emitted from throat area 17 is passed through mark 18 and the fibers of the card 19 and sensed at sensing area 22 by the photo transistor 23 (not shown). It will be understood that the two modular parts 10' and 10" are intended to be glued together as one piece along their mating parallel surfaces 42.

Refer to FIG. 6 showing in pictorial form the throat area 17 and the sensing area 22 combined together along the mutual parallel line or wall 42 which forms a baffle therebetween. The throat area 17 is approximately half the width of the mark 18 and the sensing area 22 is also approximately half the width of the mark 18. It will be understood that the mark 18 on the card 19 is pressed against the throat area 17 and sensing area 22 so that the light beam transmitted through the throat area 17 is shielded from being reflected to the sensing area 22 and is compelled to pass through the mark and into fibers of the card and under the baffle formed by the wall 42 to be sensed again at the throat area 22 whether the mark 18 is present or not. The directional arrow on the pictorial representation of mark 18 in FIG. 6 indicates that the direction of the mark when it passes under the sensing area 22 is not critical. This is to say that the mark will be sensed as a mark when passed in either direction.

Having explained a preferred embodiment of the invention and preferred manner of mounting the commercially available light emitting diode light sources and photo transistor detecting devices so as to produce signals which may be processed logically by commercially available and well known logic circuitry it will be appreciated that the novel sensor operates in a new mode of operation which has not been employed heretofore. It will be further appreciated that the light rays emitted from the light emitting diode are passed through a mark in two directions so that the light to dark ratio sensed by the commercially available devices is at least twice the available light to dark ratio provided by prior art devices. It will be further appreciated that prior art reflective devices do not have the inherent complete-light-to-complete-dark contrast to be sensed. Similary the prior art devices which attempt to completely block the light by transmitting a light through a card and blocking the light with a mark have very high attenuation characteristics and thus have low light to dark ratio outputs.

Another feature of the present invention is that the sensing device is capable of sensing the direction of movement of the mark being sensed. In the prior art special track marking on the cards and special sensing devices are employed to make this motion determination.

I claim:

1. Apparatus for sensing partially opaque marks on a fiber paper object comprising,
   light source means adapted to be directed through a portion of a mark to be sensed and into the fibers of the paper object,
   means for concentrating the light rays from said light source means,
   said means for concentrating the light rays, terminating in an open throat portion having an outlet for the light rays smaller than the mark to be sensed,
   light detecting means comprising a detector and logic sensing means,
   light separation means forming a baffle between said light source means and said light detecting means for inhibiting the passage of reflected light from said light source means,
   light directing means for directing light from the fibers at a point adjacent said throat portion to said detector, and
   said logic sensing means being coupled to said detector for indicating when a mark first blocks said throat portion and when said mark is both opposite said throat portion and said point adjacent said throat portion being detected by said light detecting means.

2. Apparatus for sensing partially opaque marks as set forth in claim 1, wherein said light source means comprises a high-intensity light capable of transmitting light into the fibers of said paper object.

3. Apparatus for sensing partially opaque marks as set forth in claim 2, wherein said high-intensity light is capable of transmitting light into the fibers of said paper object below said marks.

4. Apparatus for sensing partially opaque marks as set forth in claim 3, wherein said high-intensity light comprises a light emitting diode for generating light in the infra red spectrum.

5. Apparatus for sensing partially opaque marks as set forth in claim 4, wherein said detector comprises a silicon photo transistor capable of detecting light being radiated from the fibers of said paper object adjacent said throat portion.

6. Apparatus for sensing partially opaque marks as set forth in claim 1, wherein said means for concentrating the rays from said light source comprises walls converging toward said throat portion having highly reflective material deposited on said walls.

7. Apparatus for sensing partially opaque marks as set forth in claim 6, wherein said walls are exponential in shape.

8. Apparatus for sensing partially opaque marks as set forth in claim 1, wherein said means for concentrating the light rays from said light source includes lens means focused on said throat portion.

9. Apparatus for sensing partially opaque marks as set forth in claim 8, wherein said light directing means includes lens means focused on said point adjacent said throat portion.

10. A method for sensing partially opaque marks on a fiber paper object comprising the steps of:
    placing a mark to be sensed at a sensing station,
    directing a source of high-intensity light through a portion of said mark and into the fibers of said paper object below said mark, and
    detecting the relative amount of light being transmitted transversely through said fibers of said paper object by detecting the light in a portion of said fibers at a point adjacent the portion of the mark being exposed to said high-intensity light.

11. A method for sensing partially opaque marks as set forth in claim 10, wherein the step of detecting the relative amount of light being transmitted transversely through said fibers includes the step of detecting through a portion of said mark adjacent the portion of the mark being exposed to said high-intensity light.

* * * * *